United States Patent [19]

Burchard et al.

[11] 4,453,737
[45] Jun. 12, 1984

[54] AXLE SUSPENSION FOR MOTOR VEHICLES

[75] Inventors: Hans Burchard, Lichtenwald; Rudolf Steinecke, Weinstadt, both of Fed. Rep. of Germany

[73] Assignee: Daimler-Benz Aktiengesellschaft, Fed. Rep. of Germany

[21] Appl. No.: 332,761

[22] Filed: Dec. 21, 1981

[30] Foreign Application Priority Data

Dec. 19, 1980 [DE] Fed. Rep. of Germany ....... 3047970

[51] Int. Cl.³ .............................................. B60G 11/14
[52] U.S. Cl. .................................. 280/725; 267/20 R
[58] Field of Search ............... 280/666, 667, 670, 672, 280/698, 701, 702, 705, 709, 711, 713, 724, 725, 722; 267/20 R, 60, 615

[56] References Cited

U.S. PATENT DOCUMENTS 3,764,158 10/1973 Lukasik et al. ...................... 280/725
4,344,643 8/1982 Ray ..................................... 280/725

*Primary Examiner*—Richard A. Bertsch
*Attorney, Agent, or Firm*—Craig & Burns

[57] ABSTRACT

An axle suspension for motor vehicles, especially cross-country motor vehicle, with the suspension including a rigid axle supported, with respect to a body of the vehicle, by non-guiding springs, and with two longitudinally extending links which support the axle body. Each of the links are articulated movably to the vehicle body in an area of free link ends thereof by way of a connection. The connection is formed by a shackle joint pivotable in a longitudinal direction of the vehicle, with a longitudinal displacability or movability of the respective links being controlled by way of an additional guide link which is pivotably held on the axle side and on the vehicle body side.

29 Claims, 2 Drawing Figures

AXLE SUSPENSION FOR MOTOR VEHICLES

BACKGROUND OF THE INVENTION

The present invention relates to an axle suspension for motor vehicles and, more particularly, for cross-country motor vehicles, which includes a rigid axis supported with respect to a body of the vehicle by non-guiding springs and two longitudinal links for supporting the axle body, with the respective links being each articulated movably to the vehicle body in a region of a free end of the links by way of a connection.

An axle suspension of the aforementioned type is proposed in, for example, Offenslegungsschrift No. 2,802,631; however, a disadvantage of such a proposed axle suspension resides in the fact that difficulties are encountered in constructing the axle suspensions so that they do not have an adverse influence on the bump-steering behavior of the vehicle. This would be especially true for rear axle cross-country vehicles since stabilizing measures on the front axle which counteract this effect impair the ability of twist and thus lead to poor traction conditions.

In the above-proposed axle suspension, an attempt was made to eliminate adverse influences on the handling characteristics due to bump-steering behavior of the rear axle by influencing its suspension compression curve, and placing articulation points of the longitudinal links relatively low on the chassis; however, a disadvantage of this proposed modification resides in the fact that, the ground clearance is adversely affected and, consequently, narrow limits are also imposed on solutions of this type.

SUMMARY AND OBJECTS OF THE INVENTION

The aim underlying the present invention essentially resides in providing an axle suspension for motor vehicles, especially cross-country motor vehicles, which improves the bump-steering behavior without impairing a ground clearance of the vehicle by lowering the articulation of the longitudinal links on the side of the vehicle body.

In accordance with advantageous features of the present invention, an axle suspension of the aforementioned type is proposed wherein a connection of the links is formed by a shackle joint which is pivotable in a longitudinal direction of the vehicle and a longitudinal displacability or movability is controlled through an additional guide link held pivotably on an axle side and on the vehicle body side.

Even with the provision of longitudinal links extending obliquely forwardly and upwardly, by virtue of the construction of an axle suspension system such as proposed by the present invention, there still exists the possibility of providing a virtually neutral symmetrical suspension compression curve since, during compression and extension movements, the longitudinal link involved in the movements is displaced in a longitudinal direction by way of the additional guide link and since this displacement leads to an appropriate correction in regard to the suspension compression curve. By virtue of the corrective action, it is possible to arrange a suspension compression curve, in a driving direction, so as to extend vertically or counter to the driving direction and also progressively or regressively with respect to an axle load in dependence upon what is desired to correct the handling characteristics such as oversteering or understeering.

Advantageously, in accordance with the present invention, the additional guide link is constructed as a longitudinal link with the guide link engaging the longitudinal link which supports the axle body at a distance from the shackle joint.

The guide link of the present invention is engagable on the axle body and, in a side view, the longitudinal link and the guide link extend obliquely with respect to one another in opposite directions of extension.

In accordance with the present invention, when the longitudinal link extends, in the assembled position, obliquely and rearwardly downwardly, the guide link is arranged so as to extend obliquely forward and downward.

When the guide link of the present invention is articulated on the longitudinal link approximately in a longitudinal center thereof, the longitudinal link and guide link are located approximately symmetrically about a vertical reference plane.

The longitudinal link and guide link may, in accordance with the present invention, extend, as viewed in a side view, in the same direction.

When the longitudinal link extends, in the assembled or constructed position, obliquely rearwardly and downwardly, the guide link extends virtually horizontally.

Advantageously, in accordance with still further features of the present invention, the guide link is articulated to the axle body at a position offset upwardly with respect to the longitudinal link.

The guide link is, in accordance with the present invention, substantially shorter than the longitudinal link and, the longitudinal links may be arranged as compression links. Additionally, the longitudinal extent of the shackle joint may be vertical or upright.

Accordingly, it is an object of the present invention to provide an axle suspension for motor vehicles, especially for rear axles of cross country vehicles, which avoids, by simple means, short comings and disadvantages encountered in the prior art.

Another object of the present invention resides in providing an axle suspension for motor vehicles, especially cross-country motor vehicles, which does not reduce the ground clearance of the vehicle.

Yet another object of the present invention resides in providing an axle suspension for motor vehicles, especially cross-country motor vehicles, which improves the steering behavior of the axle suspension.

A further object of the present invention resides in providing an axle suspension for motor vehicles, especially cross-country motor vehicles which offers the possibility of providing a virtually neutral and symmetrical suspension compression curve.

A still further object of the present invention resides in providing an axle suspension for motor vehicles, especially cross-country motor vehicles, which is simple in construction and therefore relatively inexpensive to manufacture.

Another object of the present invention resides in providing an axle suspension for motor vehicles, especially cross-country motor vehicles, which guarantees perfect handling characteristics under all load conditions of the vehicle.

These and other objects, features, and advantages of the present invention will become more apparent from the following description when taken in connection with the accompanying drawings which show, for the purpose of illustration only, two embodiments in accordance with the present invention, and wherein:

DESCRIPTION OF THE PREFFERED EMBODIMENTS

Figure 1:
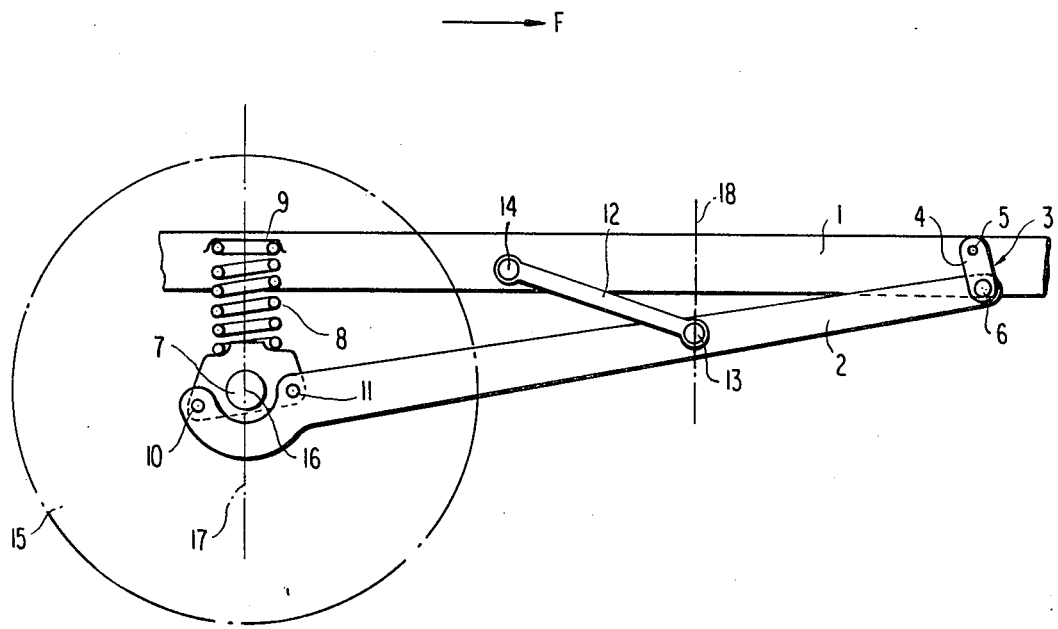
FIG. 1 is a partially schematic side view of a first embodiment of an axle suspension constructed in accordance with the present invention having a guide link articulated to a longitudinal link.

Referring now to the drawings wherein like reference numerals are used in both views to designate like parts and, more particularly, to FIG. 1, according to this Figure, a motor vehicle, especially a cross-country motor vehicle, includes a vehicle chassis and a vehicle body (not shown), with the vehicle chassis including a pair of side or frame members 1, only one of which is shown in the drawing, disposed along respective lateral sides of the motor vehicle in a conventional manner. A longitudinally extending link is associated with each of the side or frame members 1, with one end of the respective links being articulated to an associated side member 1 by way of a connection formed, for example, as a shackle joint generally designated by the reference numeral 3. The connection by the shackle joint 3 is located in a region of a forward end of the respective longitudinal links 2.

Each shackle joint 3 includes at least one shackle 4 which, in the illustrated position, extends substantially vertical and which is pivotably connected to the side member 1 and to the longitudinal link by pivot or articulation means 5, 6, respectively.

Each of the longitudinal links 2, only one of which is shown in the drawing, is connected at a rearward end in a conventional manner to an axle body 7 of a rigid axle which is supported with respect to the vehicle body by non-guiding springs formed, for example, as helical springs 8. The support for the springs, with respect to the vehicle body, is schematically illustrated in FIG. 1 by a spring seat 9. The axle body 7 and longitudinal link 2 are connected to one another at two attachment points 10, 11, on a both sides of the axle body 7 and, the two attachment or connecting points 10, 11 may be constructed so as to be elastically resilient.

A guide link 12 is provided and has one end thereof articulated to an associated longitudinal link in an area of approximately a longitudinal center region thereof. The point of articulation of the longitudinal link 2 and guide link 12, and the articulation of the guide link 12 with respect to the associated side member 1, is about articulation points 13, 14, respectively.

While the longitudinal link 2 is arranged to rise forward and upwardly with respect to its longitudinal displacement, the guide link 12 is inclined forwardly and downwardly with respect to its longitudinal axis, and the longitudinal link 2 and guide link 12 have opposite directions of extent in terms of their longitudinal arrangement.

The effect of a construction of an axle suspension on the suspension compression curve, that is, the curve or path of movement which the axle body 7, together with the wheels 15 mounted thereon, describes, in a side view, during compression and extension, is discussed more fully hereinbelow.

More particularly, if one assumes that the longitudinal link is articulated pivotably to the side member 1, not by way of a shackle joint but directly, then, starting from the illustrated position, such a connection would result in a suspension compression curve which would deviate from the perpendicular plane 17 extending through the wheel axle 16 rearwards during compression and forwards during an extension, in each case with respect to a driving direction F of the vehicle.

Because of the extent of the guide link 12, which is disposed so as to run correspondingly in an opposite direction to the longitudinal link 2, the articulation point 13 of the guide link 12 described, with respect to a perpendicular plane 18, a suspension compression curve which is practically symmetrical to the curve described above. Consequently, during compression and extension, a longitudinal displacement is forced on the longitudinal link 2 by the guide link 12, and the longitudinal displacement opposes a deviation of the suspension compression curve of the wheel 15 and axle body 7 from the perpendicular plane 17 so that, for example, a suspension compression curve lying approximately in the perpendicular plane 17 may be obtained. A necessary longitudinal displacability of the longitudinal link is guaranteed by the provision of the shackle joint 3.

By virtue of the features of an axle suspension constructed in accordance with the present invention, a simple construction results which nevertheless permits a desired and, if appropriate, even greater inclination of the longitudinal links 2 forwardly and upwardly with respect to the ground clearance of the vehicle, thereby providing axle guidance which guarantees perfect handling characteristics, since the bump-steering behavior of the axle can be maintained neutral or even may be influenced as desired for an overall coordination of the vehicle.

It is also possible in accordance with the present invention, to provide a connection between the longitudinal link and side member 1 by, for example, providing an elastic connection of the longitudinal link 2 to the side member 1, with such connection then allowing corresponding resilience in a longitudinal direction.

By appropriate coordinating of the inclinations and/or links of the links 2, 12, the suspension compression curves may also be arranged differently and specifically, in each case, with a view toward what is desirable or necessary for correcting the handling characteristics of the motor vehicle with regard to, for example, an understeering or oversteering effect.

Figure 2:
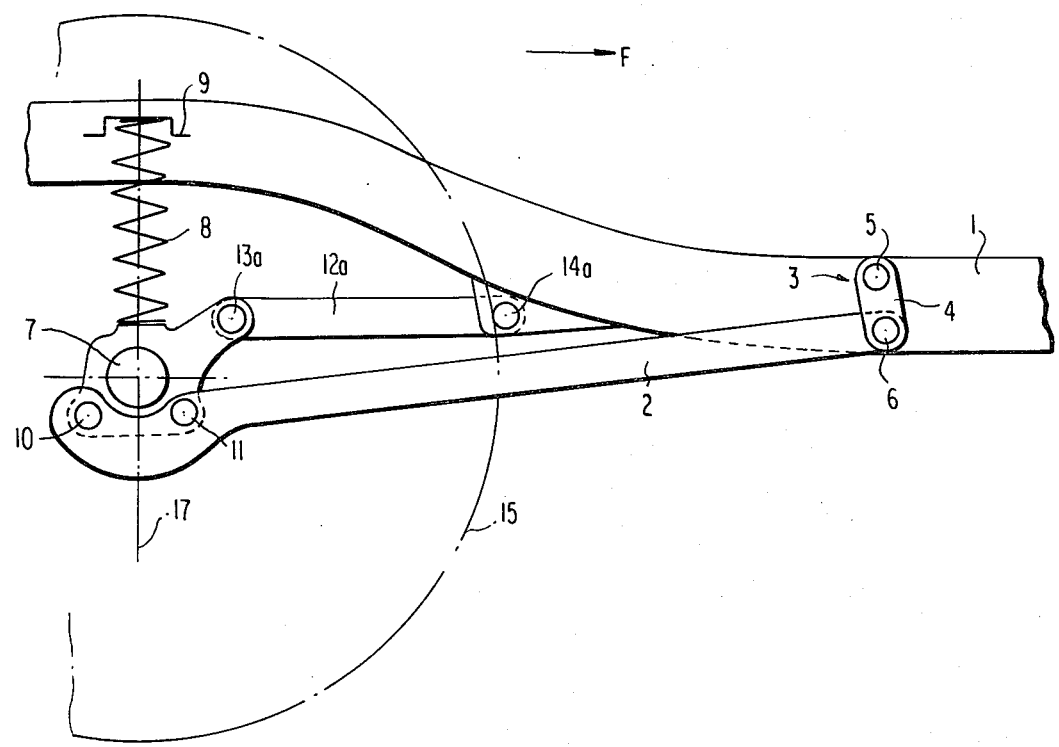
FIG. 2, is a partially schematic side view of a second embodiment of an axle suspension constructed in accordance with the present invention, with a guide link articulated to an axle body.

As shown in FIG. 2, in contradistinction to the embodiment of FIG. 1, a guide link 12a is articulated to the axle body 7. The guide link 12a assumes a virtually horizontal position when installed so that, with an increasing compression, an increasing deviation of the suspension-compression curve from the perpendicular plane 17 is obtained. With the construction of FIG. 2, contrary to the arrangement of FIG. 1, an additional fixed pivot point 13a is provided for the longitudinal link by the guide link 12a, with the pivot point being located near the axle body and offset in an upward direction with respect to the longitudinal link 2.

While We have shown and described several embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. An axle suspension for a motor vehicle wherein the axle includes a rigid axle having an axle body, comprising first means for supporting the rigid axle with respect to a body of the vehicle, second means for supporting the axle body including a pair of longitudinally extending link means, means for mounting a first end of each of the link means to a portion of the vehicle body so as to enable the respective link means to be displaced in a longitudinal direction, means for connecting a second end of each respective link means to the axle body, rigid control means connecting each respective link means to said vehicle body for controlling a longitudinal displacement of the respective link means, and means for pivotally connecting respective control means to the respective link means.

2. An axle suspension according to claim 1, wherein the motor vehicle is a cross-country motor vehicle, the rigid axle is a rear axle, and the first means for supporting the rigid axle includes non-guiding spring means interposed between the axle body and the vehicle body.

3. An axle suspension according to one of claims 1 or 2, wherein the means for connecting the first end of the link means includes a shackle joint means mounted so as to be pivotable in a longitudinal direction of the vehicle.

4. An axle suspension according to claim 3, wherein the control means includes a longitudinally extending guide link associated with each respective link means.

5. An axle suspension according to claim 4, wherein each guide link is pivotally connected to the respective link means at a predetermined distance from the shackle joint means.

6. An axle suspension according to claim 5, including means for pivotally connecting each respective guide link to the vehicle body.

7. An axle suspension according to claim 6, wherein the link means and guide links are disposed such that, in a side view, each link means and associated guide link extend obliquely to one another and in opposite longitudinal directions.

8. An axle suspension according to claim 7, wherein each link means extends obliquely rearwardly and downwardly, with each respective guide link extending obliquely forwardly and downwardly, as viewed in a normal driving direction of the vehicle.

9. An axle suspension according to claim 8, wherein the predetermined distance is equal to approximately one half of a longitudinal distance between the shackle joint means and the axle body.

10. An axle suspension according to claim 4, wherein the link means and the guide links are disposed such that, in a side view, the link means and guide links extend in the same longitudinal direction.

11. An axle suspension according to claim 10, including means for pivotally connecting the respective guide links to the axle body at a vertically offset position with respect to the link means.

12. An axle suspension according to claim 11, wherein each guide link has an axial length less than an axial length of the link means.

13. An axle suspension according to claim 12, wherein each link means is arranged as a compression link.

14. An axle suspension according to claim 13, wherein a longitudinal dimension of the shackle joint means extends in a vertical direction.

15. An axle suspension according to claim 4, wherein the link means and the guide links are disposed such that, in a side view, each respective link means extends obliquely rearwardly and downwardly, as viewed in a normal driving direction of the vehicle, and each respective guide link extends substantially horizontally.

16. An axle suspension according to claim 15, including means for pivotally connecting the respective guide links to the axle body at a vertically offset position with respect to the link means.

17. An axle suspension according to claim 16, wherein each guide link has an axial length less than an axial length of the link means.

18. An axle suspension according to claim 17, wherein each link means is arranged as a compression link.

19. An axle suspension according to claim 18, wherein a longitudinal dimension of the shackle joint means extends in a vertical direction.

20. An axle suspension according to claim 1, wherein control means includes a longitudinally extending guide link associated with each respective link means.

21. An axle suspension according to claim 20, wherein each guide link is pivotally connected to the respective link means at a position equal to approximately one-half of a longitudinal distance between the axle body and the means for pivotally connecting the control means to the link means.

22. An axle suspension according to claim 21, wherein each guide link has an axial length less than an axial length of the link means.

23. An axle suspension according to claim 22, wherein each link means is arranged as a compression link.

24. An axle suspension according to claim 23, wherein a longitudinal dimension of the shackle joint means extends in a vertical direction.

25. An axle suspension according to one of claims 20, 21, 22, 23, or 24, wherein the link means and guide links are disposed such that, in a side view, each link means and associated guide link extend obliquely to one another and in opposite longitudinal directions.

26. An axle suspension according to claim 25, wherein each link means extends obliquely rearwardly and downwardly, with the respective guide links extending obliquely forwardly and downwardly, as viewed in a normal driving direction of the vehicle.

27. An axle suspension according to one of claims 20, 21, 22, 23, or 24, wherein the link means and the guide links are disposed such that, in a side view, each respective link means extends obliquely rearwardly and downwardly, as viewed in a normal driving direction of the vehicle, and each associated guide link extends substantially horizontally.

28. An axle suspension according to one of claims 1 or 2, wherein the control means includes a longitudinally extending guide link associated with each respective link means, each link means and respective guide link are disposed such that, in a side view, the link means and guide links extend in the same longitudinal direction.

29. An axle suspension according to claim 28, including means for pivotally connecting each respective guide link to the axle body at a vertically offset position with respect to the link means.

* * * * *